(12) United States Patent
McLean et al.

(10) Patent No.: US 8,361,668 B2
(45) Date of Patent: Jan. 29, 2013

(54) DEVICES FOR MANAGING HEAT IN PORTABLE ELECTRONIC DEVICES

(75) Inventors: Gerard F McLean, West Vancouver (CA); Joerg Zimmermann, Vancouver (CA)

(73) Assignee: Societe BIC (FR)

( * ) Notice: Subject to any disclaimer, the term of this patent is extended or adjusted under 35 U.S.C. 154(b) by 527 days.

(21) Appl. No.: 12/473,202

(22) Filed: May 27, 2009

(65) Prior Publication Data

US 2009/0297895 A1    Dec. 3, 2009

Related U.S. Application Data

(60) Provisional application No. 61/056,413, filed on May 27, 2008.

(51) Int. Cl.
*H01M 8/04* (2006.01)
*H01M 10/50* (2006.01)

(52) U.S. Cl. ........ 429/434; 429/120; 429/442; 429/513; 429/515

(58) Field of Classification Search .................. None
See application file for complete search history.

(56) References Cited

U.S. PATENT DOCUMENTS

| | | | |
|---|---|---|---|
| 2005/0014040 A1* | 1/2005 | Kaye | 429/20 |
| 2005/0058866 A1* | 3/2005 | Rocke et al. | 429/26 |
| 2007/0231633 A1* | 10/2007 | Kitamura et al. | 429/20 |
| 2008/0038617 A1* | 2/2008 | McLean et al. | 429/34 |

* cited by examiner

*Primary Examiner* — N Drew Richards
*Assistant Examiner* — Michael Jung
(74) *Attorney, Agent, or Firm* — Schwegman Lundberg & Woessner, P.A.

(57) ABSTRACT

Embodiments of the invention relate to a heat management system for a portable electronic device. The system includes at least one fuel cell, at least one electrical power consumer electrically connected to the at least one fuel cell, an endothermic fuel system configured to provide fuel to the at least one fuel cell and at least one thermal transmission path thermally coupling the at least one electrical power consumer and the endothermic fuel system. At least a portion of heat produced by the electrical power consumer is transferred to the endothermic fuel system.

28 Claims, 7 Drawing Sheets

DEVICES FOR MANAGING HEAT IN PORTABLE ELECTRONIC DEVICES

PRIORITY OF INVENTION

This non-provisional application claims the benefit of priority under 35 U.S.C. §119(e) to U.S. Provisional Patent Application Ser. No. 61/056,413, filed May 27, 2008, which is herein incorporated by reference in its entirety

BACKGROUND

Electrochemical energy conversion devices, such as fuel cell devices, are configured to convert chemical energy to electrical energy, or electrical energy to chemical energy. For example, fuel cell devices convert chemical energy in the form of a fuel and an oxidant, to electrical energy, in the form of electricity. Accordingly, fuel cell devices may provide a useful alternative to battery-based power supply systems in many portable electronic devices.

Heat production is known to be a factor limiting the design of portable and handheld electronic devices. These devices include electronic and Radio Frequency circuits which generate heat when in operation. Increasing the functionality of such devices, such as by increasing the array of computing applications contained in the device, increasing the size of the screen, or increasing the bandwidth of the communications protocol all tend to increase the power which must be dissipated by the device.

Power dissipation may be done in a passive way, i.e. without active coolants or active means of cooling such as fans etc. Passive heat management is commonly incorporated in portable electronic devices to direct heat to areas where it can be dissipated (through radiation, convection or conduction). For example, laptop computers contain significant amounts of thermally conductive graphite materials and CPU's commonly require some form of high surface area heat-sink.

BRIEF DESCRIPTION OF THE DRAWINGS

Various embodiments are described in detail in the discussion below and with reference to the following drawings.

DETAILED DESCRIPTION

Figure 1:
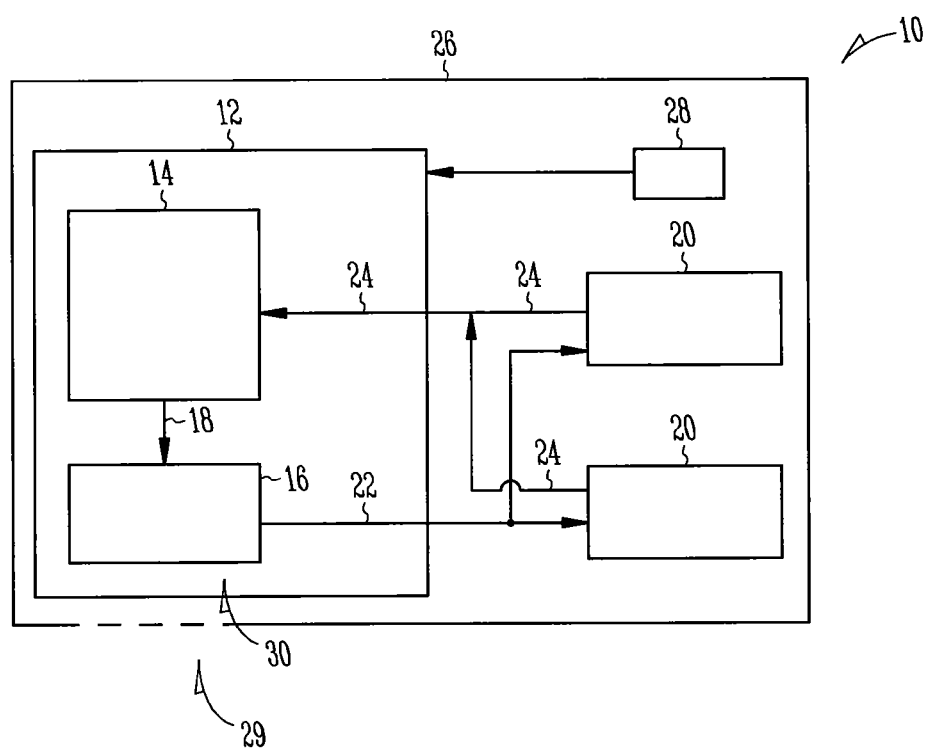
FIG. 1 is a diagrammatic block view of an application device, according to the various embodiments.

The various embodiments include electrochemical energy conversion systems and methods for operating such devices. Specific details of various embodiments are set forth in the following description and in FIGS. 1 through 3 to provide a thorough understanding of such embodiments. It is understood that that additional embodiments are possible, and that the various embodiments may be practiced without several of the details disclosed in the following description.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a heat management system for a portable electronic device. The system includes at least one fuel cell, at least one electrical power consumer electrically connected to the at least one fuel cell, an endothermic fuel system configured to provide fuel to the at least one fuel cell and at least one thermal transmission path thermally coupling the at least one electrical power consumer and the endothermic fuel system. At least a portion of heat produced by the electrical power consumer is transferred to the endothermic fuel system. Additionally, embodiments relate to a method of managing heat generated in an application device. The method includes transferring at least a portion of heat produced by an electrical power consumer to a reactant supply configured to deliver a reactant to a fuel cell device and stimulating the release of the reactant from the reactant supply in response to the transferred heat.

Fuel cell systems are emerging as an alternative power source to batteries for portable applications. Fuel cells themselves operate at fairly low efficiency compared to batteries, and so the actual fuel cell device (not the overall system) may be a net contributor of heat to the system. In some fuel cell systems, the fuel may need to be kept cool as well, to prevent volatility and increasing pressure. As demand for mobile computing services in portable applications increases, this heat management problem becomes central to hardware design.

However, if an endothermic fuel system may be used, a system component is introduced with a negative heat production profile. This may be advantageous in offsetting the heat production from electronic components, fuel cell components or both. In general, embodiments of the invention describe a system that can operate using an endothermic fuel source so as to offset or even eliminate net heat production from the overall system.

The system may include such components as an electronic circuit, a fuel cell, related fuel system components, related power management components, an endothermic fuel source and some means of starting the system. In operation, heat from the power generating and consuming components may be used to drive fuel production from the endothermic fuel source to generate fuel to deliver power. It may be possible to choose the characteristics of the endothermic fuel source to optimize this system for minimum heat production while still maintaining high energy density from the fuel source.

Potential benefits of designing a fuel cell system in this manner may include that heat may be absorbed from the electronic circuits and fuel cell to produce a net decrease in system heat production, and that high temperature hydrogen storage materials or hydrogen generation materials, which may possess higher energy densities than low-temperature systems, may be used.

Additional benefits may include the ability to eliminate or reduce the need for heat management or cooling components (such as heat sinks, fans, etc), by the incorporation of an endothermic fuel system, for example. In this way, a component whose function may be solely to remove or manage heat, may be replaced with a component which provides a functional benefit (e.g. in the form of fuel storage) in addition to removing, absorbing, or managing heat within the device. Such a system may beneficially be simplified by the incorporation of dual-purpose components. Alternately, in some embodiments, instead of enabling the reduction or elimination of heat management or cooling components, the addition of an endothermic fuel system as described in this application may permit the incorporation of additional components which generate heat within an application device (e.g. bigger, more, and/or more powerful electrical components which consume power and generate heat), that otherwise would not be possible to add without incorporation of additional heat sink capabilities.

DEFINITIONS

As used herein, "application device" may refer to a device that requires a supply of power to operate power-consuming components of the device. Portable electronic devices are application devices. Examples of application devices include cellular phones, satellite phones, personal digital assistants (PDA), global positioning systems (GPS), 2-way radios, handheld point-of-sale (POS) terminals, ultra mobile personal computers (UMPCs), laptop computers, Mobile Internet Devices, computer accessories, displays, personal audio or video players, medical devices, televisions, transmitters, receivers, radio frequency identification devices (RFIDs), lighting devices, electronic toys, cameras, radios, or scanners.

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), direct methanol fuel cells, phosphoric acid fuel cells, solid oxide fuel cells (SOFCs), molten carbonate fuel cell (MCFCs), alkaline fuel cells, other suitable fuel cells, and materials thereof. An electrochemical cell layer including a plurality of unit cells may be constructed, for example, as described in the commonly-assigned U.S. application Ser. No. 11/047,558 filed 4 May 2004, which was entitled "MEMBRANES AND ELECTROCHEMICAL CELLS INCORPORATING SUCH MEMBRANES" and issued as U.S. Pat. No. 7,378,176 on 27 May 2008, the disclosure of which is herein incorporated by reference. Examples of arrays of electrochemical cells, which may be planar, are described in co-owned U.S. application Ser. No. 11/047,560 filed on 2 Feb. 2005 which was entitled "ELECTROCHEMICAL CELLS HAVING CURRENT CARRYING STRUCTURES UNDERLYING ELECTROCHEMICAL REACTION LAYERS" and issued as U.S. Pat. No. 7,632,587 on 15 Dec. 2009, the disclosure of which is herein incorporated by reference. Fuel cells in an array can also follow other planar surfaces, such as tubes as found in cylindrical fuel cells. Alternately or in addition, the array can include flexible materials that can be conformed to other geometries. Unit cells according to the invention may be used in a planar electrochemical cell layer that is conformable to other geometries, as described in commonly-owned U.S. Pat. No. 7,474,075, issued Jan. 6, 2009, entitled "DEVICES POWERED BY CONFORMABLE FUEL CELLS" and commonly-owned U.S. Patent Application 2009/0081493, entitled "FUEL CELL SYSTEMS INCLUDING SPACE-SAVING FLUID PLENUM AND RELATED METHODS" and commonly-owned U.S. Patent Application 2006/0127734, entitled "FLEXIBLE FUEL CELL STRUCTURES HAVING EXTERNAL SUPPORT", where are hereby incorporated by reference.

As used herein, "hydrogen generator" refers to a component or components that produce hydrogen when activated by a stimulus. In the present invention, the hydrogen generator may be a thermally-activated hydrogen generator which includes one or more materials that generate or release hydrogen in response to heat. Such materials may chemically or physically bind hydrogen or may produce hydrogen as a product of a chemical reaction. One or more catalysts may be utilized with such materials to facilitate the generation of hydrogen. Examples of hydrogen-binding materials include metal hydrides, suitable zeolites, and carbon-based reversible hydrogen-storing materials such as suitable carbon nanotubes, carbon fibres, carbon aerogels, and activated carbon. Examples of materials that may produce hydrogen as a product of a chemical reaction include chemical hydrides, hydrocarbon hydrogen carriers, and other suitable hydrogen-containing compounds, such as ammonia, amine boranes, alcohols such as methanol and ethanol, and formic acid. Such materials may produce hydrogen via any suitable reactions including without limitation thermolysis, hydrolysis, reforming, and electrolysis.

As used herein, "endothermic apparatus" refers to a device, structure, or system that facilitates an endothermic process or reaction. An example may be an endothermic fuel system, for example. An endothermic process or reaction absorbs energy in the form of heat.

As used herein, "heat pump" or "thermoelectric device" refers to a machine or device that moves heat from a first thermally-defined region to a second thermally-defined region through the application of work to the heat pump.

As used herein, "fluid enclosure" refers to a device for storing a fluid. The fluid enclosure may store a fluid physically through confinement or in a combined chemical state. For example, the fluid enclosure may chemically store a fluid in active material particles. Additional examples and details regarding embodiments of fluid enclosures can be found in a commonly owned and co-pending U.S. Application Pub. No. 2007/0295617 entitled FLUID ENCLOSURE AND METHODS RELATED THERETO, filed 23 Jun. 2006 and issued as U.S. Pat. No. 7,563,305 on 21 Jul. 2009 and which is incorporated by reference in its entirety.

As used herein, "functional unit" refers to an apparatus that performs a specific function for an application device. For example, the functional unit may be a fuel cell system for supplying power to one or more components of an application device. The functional unit may be a removable part of an application device, or it may be integrated within an application device.

As used herein, "active material particles" refer to material particles capable of storing hydrogen or other fluids or to material particles that may occlude and desorb hydrogen or another fluid. Active material particles may include fluid-storing materials that occlude fluid, such as hydrogen, by chemisorption, physisorption or a combination thereof. Some hydrogen-storing materials desorb hydrogen in response to stimuli, such as change in temperature, change in heat or a change in pressure. Examples of hydrogen-storing materials that release hydrogen in response to stimuli, include metal hydrides, chemical hydrides, suitable micro-ceramics, nano-ceramics, boron nitride nanotubes, metal organic frameworks, palladium-containing materials, zeolites, silicas, aluminas, graphite, and carbon-based reversible fluid-storing materials such as suitable carbon nanotubes, carbon fibers, carbon aerogels, and activated carbon, nano-structured carbons or any combination thereof. The particles may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof. The active material particles may be formed into a composite hydrogen storage material. Examples of such materials can be found in commonly-owned U.S. Patent Application Pub. No. 2006/0237688, entitled "COMPOSITE HYDROGEN STORAGE MATERIAL AND METHODS RELATED THERETO", filed 24 Apr. 2006 and now issued as U.S. Pat. No. 7,708,815 on 4 May 2010 which is incorporated by reference herein.

As used herein, "occlude" or "occluding" or "occlusion" refers to absorbing or adsorbing and retaining a substance, such as a fluid. Hydrogen may be a fluid occluded, for example. The fluid may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen or other fluid may be bound physically or chemically, for example.

As used herein, "contacting" refers to physically, chemically, electrically touching or within sufficiently close proximity. A fluid may contact an enclosure, in which the fluid is physically forced inside the enclosure, for example.

As used herein, "hydrogen carrier" refers to hydrogen, any compound including a hydrogen bond, materials including such compounds, or combinations thereof. Examples of hydrogen carriers include hydrogen, alcohols such as methanol and ethanol, amines such as ammonia and hydrazine, silanes such as disilane, trisilane, disilabutane, complex metal hydride compounds such as aluminum borohydride, boranes such as diborane, hydrocarbons such as cyclohexane carbazoles such as dodecahydro-n-ethyl carbazole, and other saturated cyclic, polycyclic hydrocarbons, saturated amino boranes such as cyclotriborazane.

As used herein, "structural filler" refers to a material with a sufficient tensile strength to withstand the internal pressure of a fluid enclosure, when pressurized with a fluid. Structural fillers may be solid. Structural fillers may include metallic or plastic lattices, composite hydrogen storage materials, clathrates, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example.

As used herein, "conformably coupled" refers to forming a bond that is substantially uniform between two components and are attached in such as way as to chemically or physically bind in a corresponding shape or form. A structural filler may be conformably coupled to an outer enclosure wall, for example, in which the outer enclosure wall chemically or physically binds to the structural filler and takes its shape.

As used herein, "outer enclosure wall" refers to the outermost layer within a fluid enclosure that serves to at least partially slow the diffusion of a fluid from the fluid enclosure. The outer enclosure wall may include multiple layers of the same or differing materials. The outer enclosure wall may include a polymer or a metal, for example.

Application devices generally include electrical components that dissipate heat. As a result, application devices are typically net producers of heat. In order to mitigate the effects of the net heat production, the inventors have made the discovery that heat management systems, as described herein, may be integrated within the application device to manage heat within the device.

FIG. 1 is a diagrammatic block diagram of an application device 10 according to various embodiments. The application device 10 may include a functional unit 12 that may further include an endothermic apparatus 14, and one or more electrochemical cells 16 that receive a fuel flow 18 from the endothermic apparatus 14. The electrochemical cells 16 accordingly generate electrical power that may be delivered to one or more electrical power consumers 20 through an electrical bus 22 coupling the one or more electrical power consumers 20 to the electrochemical cells 16. The endothermic apparatus 14 includes a fluid enclosure, which may include a fuel in a fluid form (e.g., gas or liquid) of hydrogen or in a defined chemical form, such as a hydrogen carrier. The electrical power consumers 20 may be associated with (or even an integral part of) an electronic device, such as cellular phones, satellite phones, personal digital assistants (PDA), global positioning systems (GPS), 2-way radios, handheld point-of-sale (POS) terminals, ultra mobile personal computers (UMPCs), laptop computers, Mobile Internet Devices, computer accessories, displays, personal audio or video players, medical devices, televisions, transmitters, receivers, radio frequency identification devices (RFIDs), lighting devices, electronic toys, cameras, radios, or scanners, although other electronic devices are known. Examples of electrical power consumers may include any electronic components found in such electronic devices, such as radio frequency (RF) circuits and power amplifiers.

Although two electrical power consumers 20 are shown in FIG. 1, it is understood that the application device 10 may include fewer than two, or more than two of the electrical power consumers 20, and that the electrical power consumers 20 may be substantially similar units. Fuel cell power conditioning components may also be included in the various embodiments. Alternatively, the electrical power consumers 20 may include units that are substantially mutually distinct, in terms of functionality, power consumption and heat dissipation. In either case, the application device 10 includes one or more thermal transmission paths 24 thermally coupled to the electrical power consumers 20 and the endothermic apparatus 14, which are configured to thermally communicate heat from the one or more electrical power consumers 20 to the endothermic apparatus 14. Although FIG. 1 shows a single thermal transmission path 24 extending into the functional unit 12, other configurations are possible. For example, each of the electrical power consumers 20 may be thermally coupled to distinct thermal transmission paths 24 that individually extend to the endothermic apparatus 14. Alternatively, the thermal transmission paths 24 may be suitably grouped before the thermal transmission paths 24 are thermally coupled to the endothermic apparatus 14. The thermal transmission paths 24 will be discussed in greater detail below.

The application device 10 may also include a housing 26 that at least partially encloses the functional unit 12, the electrical power consumers 20, and a secondary device 28. The secondary device 28 will also be discussed in greater detail below. The housing 26 may include one or more apertures 29 that fluidly communicate with the ambient environment, so that an oxidant (e.g., atmospheric air) may be communicated to the electrochemical cells 16, and reaction products (e.g., water vapor) may be communicated to the ambient environment. The one or more apertures 29 may also permit waste heat generated by the electrochemical cell 16 to be released to the ambient environment. At least a portion of the electrochemical cell 16 may be positioned near the exterior of the device 10. For example, a heat-dissipative portion 30 of the electrochemical cell 16 (e.g., a cathode portion of a PEMFC) may be positioned proximate to the one or more apertures 29 to dissipate the waste heat to the ambient environment. At least a portion of the heat may be dissipated to an ambient environment through one or more cathodes and such heat may be directed by an air flow, for example. Further, waste heat that may otherwise require dissipation from the electrical power consumers may be transferred at least in part to the heat-dissipative portion 30 proximal to the ambient environment rather than through the housing, for example.

During operation of the application device 10, the electrical power consumers 20 generate heat that may, at least in part, require dissipation from the electrical power consumers 20. Rather that dissipating the generated heat through the housing 26, the generated heat may be communicated along the thermal transmission paths 24 to the endothermic apparatus 14. When the endothermic apparatus 14 absorbs the generated heat, the fuel flow 18 may be stimulated, so that the functional unit 12 provides useful amounts of electrical power that may be communicated to the electrical power consumers 20 by the electrical bus 22. The system may further comprise power conditioning components.

The application device 10 will now be discussed in greater detail. In the various embodiments, the functional unit 12 is a power supply for delivering power to an appliance, which generally incorporates the electrical power consumers 20. The power supply may include the one or more electrochemical cells 16, which may include fuel cells, and the endothermic apparatus 14 may include a reactant supply, which may include, for example, a hydrogen generator. Since direct hydrogen fuel cells typically operate at higher efficiencies and therefore produce less heat than fuel cells operating directly from other energy carriers, the endothermic apparatus 14 may include an endothermic hydrogen supply, or an endothermic hydrogen generator for providing hydrogen to the fuel cells. The endothermic hydrogen generator, or the endothermic hydrogen supply, may absorb heat to produce, desorb, or otherwise provide hydrogen that may be delivered to the fuel cells. Upon receiving the hydrogen, the fuel cells may convert the hydrogen and oxidant, such as oxygen in the air received through the aperture 29 and elsewhere, to electricity for the electrical power consumers 20 in the application device 10. In doing this, the net amount of heat generated per unit of electrical service delivered may be reduced. Further, in the various embodiments, the heat absorbed by the endothermic apparatus 14 may be maximized (i.e., by selecting hydrogen carriers and processes with high enthalpies and/or temperatures associated with hydrogen release) such that the fuel cell power supply has a net cooling effect on the electrical power consumers 20 of the application device 10. The change in enthalpy of the endothermic apparatus, such as a fuel system, may be less than or equal to 40 KJ/mol of hydrogen produced, for example.

Under some conditions, such as during a start-up mode of the application device 10, the secondary device 28 may provide additional energy to initiate operation of the endothermic apparatus 14. In various embodiments, the secondary device 28 may include a secondary electrochemical cell, such as a storage battery. The battery may provide power to the electrical power consumers 20 until sufficient heat is available to initiate hydrogen production by the endothermic hydrogen generator, although the battery may also function for other purposes, such as, providing heat during cold conditions and/or for conventional use in hybrid systems. The battery may also provide energy to a heater to provide heat for the endothermic apparatus 14. The secondary device 28 may also include a heater, (e.g., a resistive heating element coupled to the battery) that is operable to transfer heat to the endothermic apparatus 14 during startup. The secondary device 28 may also include a hydrogen store for providing an initial amount of hydrogen to the fuel cells until sufficient heat is available to initiate hydrogen production by the endothermic apparatus 14. The secondary device 28 may also include a catalytic heater that is fueled by residual amounts of hydrogen obtained from the endothermic apparatus 14, or from a small hydrogen reservoir positioned within the device that is fluidly coupled to the secondary device 28, so that sufficient heat is available to initiate hydrogen production by the endothermic apparatus 14. Thus, the properties of the endothermic apparatus 14 may be selected to optimize the system for minimum heat production while still maintaining high energy density of the fuel source. This feature will be described in greater detail below.

With reference still to FIG. 1, heat generated by the electrical power consumers 20 may be transferred to the endothermic apparatus 14. Heat generated by the electrochemical cells 16 may also be transferred to the endothermic apparatus 14. The heat recovered from the electrical power consumers 20 may be communicated in a variety of ways, which may include passive mechanisms, active mechanisms, or a combination of passive and active mechanisms. For example, passive heat transfer mechanisms may include the use of high thermal conductivity materials in conductive structures. Other passive mechanisms may include phase change devices, such as thermal heat pipes, or thermo-siphons. Active heat transfer devices may include, for example, a thermoelectric device (e.g., a Peltier device, or thermoelectric heat pump) suitably positioned between the electrical power consumers 20 and the endothermic apparatus 14. Accordingly, upon the application of an electric current to the thermoelectric device, heat may be actively communicated from a first thermal interface on the thermoelectric device that thermally communicates with the electrical power consumers 20 to a second thermal interface that thermally communicates with the endothermic apparatus 14. By controlling the current applied to the thermoelectric device, the heat communicated between the electrical power consumers 20 and the endothermic apparatus 14 may also be controlled. Heat transmission paths that include a thermoelectric heat pump are therefore capable of upgrading heat transmitted to the endothermic apparatus 14. In another example, passive devices and active devices may be combined, either in a series thermal arrangement, or in a parallel arrangement, so that a passive thermal path augments the active thermal path, and may also serve as a redundant thermal path in the event a failure occurs in the active thermal path.

The properties of the endothermic apparatus 14 may be selected to optimize the system for minimum heat production while still maintaining high energy density of the fuel source. The endothermic apparatus 14 may include a fluid enclosure for storing compressed hydrogen. The expansion of compressed gas is an example of an endothermic process. Alternatively, endothermic chemical reactions that generate hydrogen may proceed within the endothermic apparatus 14. The endothermic apparatus 14 may include a fluid enclosure containing active material particles, such as a metal hydride, a hydrogen carrier, hydrogen gas or combinations thereof, for example. Certain metal hydrides may be selected over others based on the temperature range for the absorption and/or desorption of hydrogen. For example, magnesium containing hydrides and more recently developed metal hydrides require relatively higher levels of energy to proceed and therefore exhibit limited release of hydrogen at ambient temperatures. In another example, it may be desirable to use hydrogen carriers which having desorption characteristics within a temperature range of 75-120 deg. C.

With appropriate catalysts, dehydrogenation of various hydrogen carriers proceeds in an endothermic reaction. Examples of hydrocarbons that release hydrogen in an endothermic dehydrogenation reaction include methylcyclohexane, decalin, dicyclohelxyl, and cyclohexane.

Larger hydrocarbons such as pi-conjugated molecular structures also absorb heat during dehydrogenation. Examples of liquid hydrogen carriers that produce hydrogen in an endothermic reaction include compounds comprising phenyl-substituted silanes, aryl-substituted oligomers, low molecular weight polymers of ethylene, low molecular weight polymers of phenylene, oligomers of aryl- and vinyl-substituted siloxanes where aryl groups are phenyl, tolyl, naphthyl and anthracyl groups. Decomposition of ammonia, amine-boranes and their derivatives, and metal amine salts may also occur in the endothermic apparatus 14.

Figure 2:
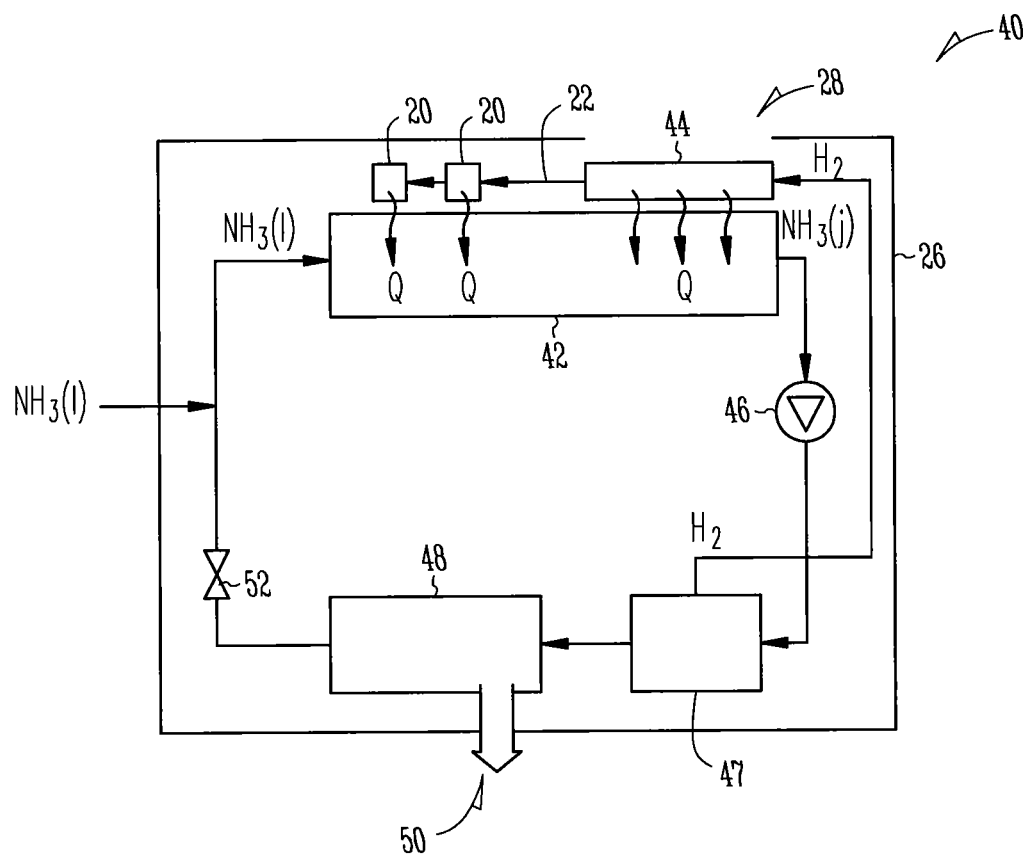
FIG. 2 is a diagrammatic block view of an application device, according to the various embodiments.

FIG. 2 is a diagrammatic block diagram of an application device 40 according to various embodiments. Many of the details in FIG. 2 may have been discussed previously, and in the interest of brevity, these details will not be described further. In general terms, the application device 40 includes a vapor compression loop that utilizes an ammonia hydrogen carrier as a working fluid that is also operable to decompose ammonia into gaseous hydrogen and nitrogen. Liquid (anhydrous) ammonia may be supplied to the application device 40 and directed to an evaporator 42 proximal to one or more heat sources, such as the electrical power consumers 20 and a fuel cell array 44, which direct heat to the evaporator 42. In this regard, at least a portion of the fuel cell array 44 may be thermally coupled to the evaporator 42. The ammonia hydrogen carrier may then be directed to a compressor 46 to increase the temperature and the pressure of the ammonia hydrogen carrier. The compressor 46 may include various micro-electromechanical systems (MEMs) devices that may be piezoelectrically or electromagnetically actuated. Thermodynamic conditions at the outlet of the compressor 46 may be sufficient to permit the dissociation of ammonia in a reformer 47 to produce hydrogen that may be directed to the fuel cell array 44. A condenser 48 then receives the effluent and the ammonia discharged from the reformer 47, and rejects heat 50 to the ambient environment as the residual ammonia condenses. The condensed ammonia may then be routed to a throttling device 52 that is configured to adjust the thermodynamic state of the ammonia discharged by the condenser 48 so that it is compatible with the conditions at the inlet at the evaporator 42. Accordingly, the remaining ammonia (and reaction products from the decomposition) may be re-routed through the loop.

Referring now to FIG. 1 and also to FIG. 2, the fuel cells may include an array of fuel cells such that a heat-dissipative portion 30 of the electrochemical cell 16 in FIG. 1 or the array 44 in FIG. 2 may be arranged within the application devices 10 and 40 proximal to the aperture 29 in the housing 26, so that communication with ambient air is obtained. As such, the electrochemical cell 16 and the array 44 may dissipate heat from a surface proximal to the exterior of the application devices 10 and 40, respectively. In such embodiments, the electrochemical array may be a planar electrochemical array, and may be positioned such that all or part of a major surface of the array (e.g. air-breathing cathodes on a planar array) is in contact with ambient air, enabling heat produced during operation of the electrochemical cell to be dissipated to the external environment through convection of ambient air across the surface (e.g. across the cathodes). Such convection may be forced or unforced. In such a manner, although an electrochemical cell may be a net heat producer, its effect on the net quantity of heat to be managed within the application device may be minimized through the dissipation of heat from the cathodes into the ambient air. Examples of electrochemical arrays which may be incorporated into an application device in such a fashion include those described in commonly-owned U.S. Pat. No. 7,474,075, issued Jan. 6, 2009, entitled "DEVICES POWERED BY CONFORMABLE FUEL CELLS", and commonly-owned U.S. Patent Application 2009/0081493, entitled "FUEL CELL SYSTEMS INCLUDING SPACE-SAVING FLUID PLENUM AND RELATED METHODS" and U.S. Patent Application 2006/0127734, entitled "FLEXIBLE FUEL CELL STRUCTURES HAVING EXTERNAL SUPPORT", already incorporated by reference herein. In the various embodiments, heat may be upgraded for absorption by the endothermic apparatus 14 and subsequently dissipated as low-grade heat from the cathode side of the fuel cell array. Examples of fuel cells that may provide suitable heat dissipation structures may be found in commonly-owned U.S. Pat. No. 7,205,057, issued Apr. 17, 2007, entitled "INTEGRATED FUEL CELL AND HEAT SINK ASSEMBLY", which is herein incorporated by reference. The energy management issues will be discussed in greater detail below.

Figure 4:
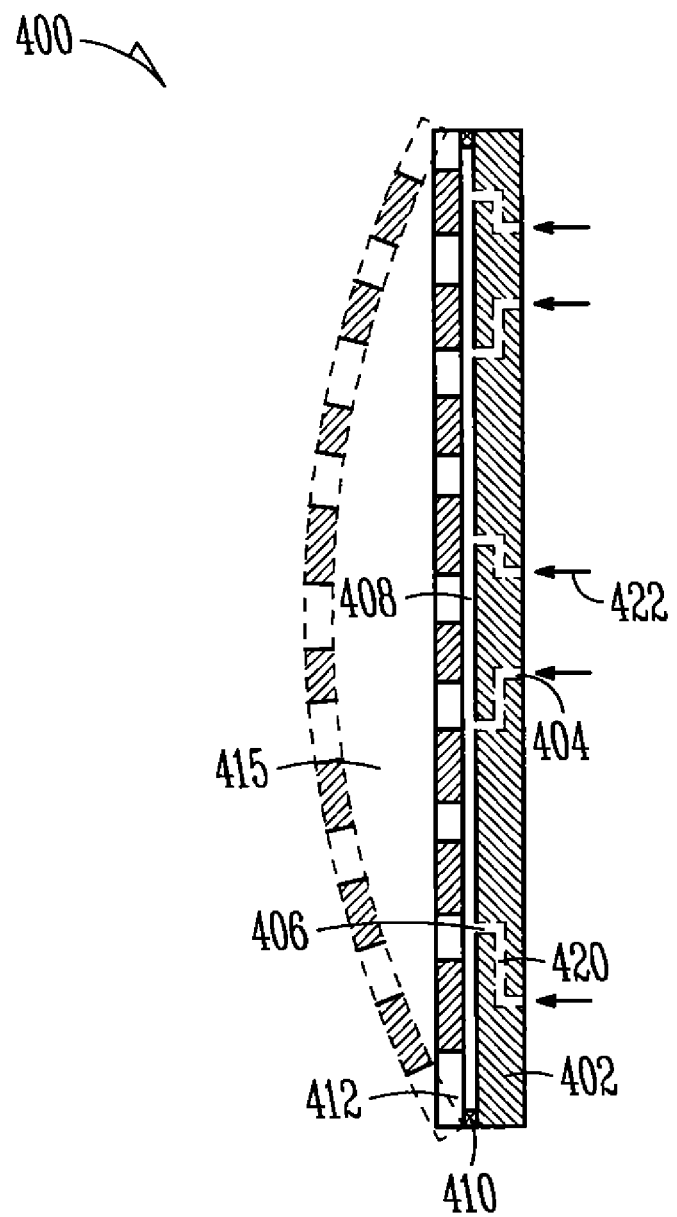
FIG. 4 is a cross-sectional view of portions of a fuel cell system, including a fluid manifold, a bond member, and at least one fuel cell, according to some embodiments.

FIG. 4 illustrates one example of an electrochemical array which may be incorporated into an application device. FIG. 4 illustrates a cross-sectional view of portions of a fuel cell system 400, including fluid manifold 402, bond member 410, and fuel cell layer 412. The fuel cell layer 412 is coupled with portions of fluid manifold 402 via bond member 410, and in this way, creates one or more enclosed regions 408 therebetween. Bond member 410 can include any physical or chemical means, such as an adhesive member, a weld member, a solder member, a braze member, or mechanical fasteners or protrusions. For instance, bond member 410 can be a structural thermoset epoxy adhesive that may be cured under appropriate conditions of heat, pressure, or combinations thereof to create the bond between fluid manifold 402 and fuel cell layer 412. Heating and pressing may be done simultaneously or sequentially. In an example, enclosed region 408 has a thickness that is approximately equal to a cross-sectional thickness of bond member 410, such as about 0.05 mm or less. In another example, fluid manifold 402 and fuel cell layer 412 have a combined cross-sectional thickness of about 5 mm or less, 1 mm or less, or 0.6 mm or less.

As shown, fluid manifold 402 may include a material directing recess 420 extending therethrough. Each material directing recess 420 receives, at an input 404, fuel flow 422 from a fluid enclosure or reservoir and provides, at an output 406, fuel flow 422 to the enclosed region 408. In an example, the fuel flow includes at least one of hydrogen, methanol, formic acid, butane, borohydride compounds (including sodium and potassium borohydride), or liquid organic hydrogen carriers. The continuing receipt of fuel flow 422 to the enclosed region 408 causes portions of fuel cell layer 412 to deform from a position adjacent the fluid manifold 402, thereby forming fluid plenum 415. Fluid plenum 415 is sufficient in size to serve as a fuel distribution plenum for the fuels cells incorporated in fuel cell layer 412. In operation, a fluid enclosure is filled with fuel and a fluid pressure regulator assembly, including an array of fluid pressure regulator devices, is used to reduce or maintain a pressure in fluid plenum 415 to a level sufficient for the operation and movement of the fuel cells in fuel cell layer 412, such as to the position shown in phantom. In an example, a distance between fluid manifold 402 and the fuel cell layer 412 is about 5 mm or less at the pressurized plenum state. In some embodiments, a distance between fluid manifold 402 and the fuel cell layer 412 may be substantially the same in the pressurized plenum state as in the unpressurized plenum state, where deformation of the fuel cell layer may be very small. In some embodiments, such as when the system includes internal supports, portions of the fuel cell layer may deform sufficient to transform the enclosed space into a fluid plenum while some portions may remain stationary.

Figure 5A:
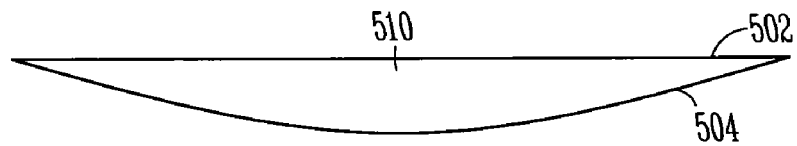
FIGS. 5A-5E are simplified cross-sectional views of various other embodiments in which either the fuel cell layer or the fluid manifold or both deform to create a fluid plenum when the enclosure region is pressurized, according to some embodiments.
Figure 5B:
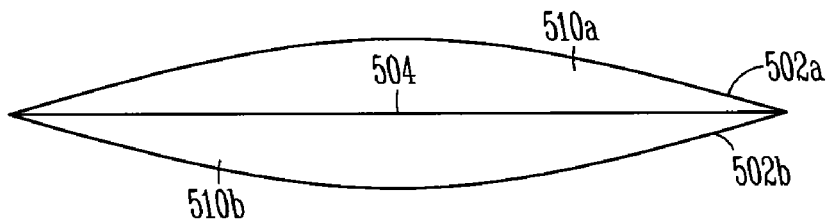

FIGS. 5A-5E illustrate cross-sectional views of various other embodiments where a fuel cell layer or the fluid manifold or both deform to create a fluid plenum when the enclosed region is pressurized. In FIG. 5A, fluid manifold 504 is a flexible component and fuel cell layer 502 is relatively rigid. When fluid is admitted to the enclosed region in between, fluid plenum 510 is created. (Compare this embodiment to that in FIG. 4 in which fuel cell layer 412 is flexible and fluid manifold 402 is relatively rigid.) FIG. 5B shows yet another alternative in which the system comprises two flexible components. In FIG. 5B, there are two flexible fuel cell layers 502a, 502b bonded to fluid manifold 504. Upon pressurizing the enclosed regions therebetween, two fluid plenums 510a, 510b are formed.

Figure 5C:
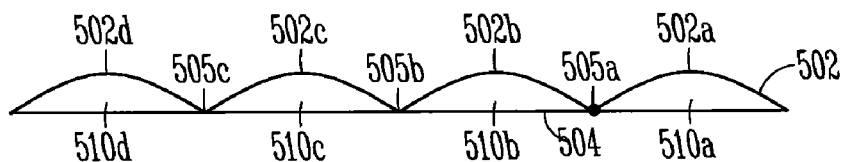
Figure 5D:
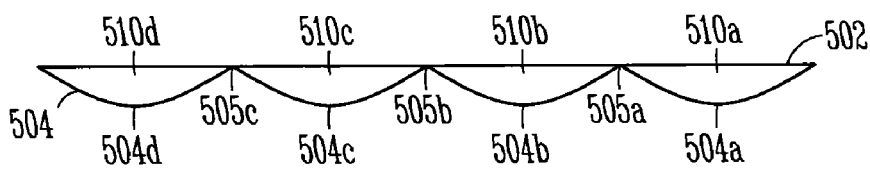
Figure 5E:
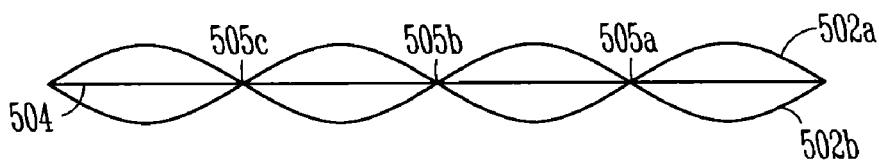

FIGS. 5C-5E show yet further alternatives comprising internal supports such as bond members, spacers, collapsible columns, or the like, that are intended to at least restrict the outward expansion of the flexible layers in the assembly. The reason for this is that during any movement, the flexible layers may change position or move outwardly and the risk of rupture increases. This approach may prevent such ruptures. Referring to FIG. 5C, a cross sectional view of an embodiment comprising flexible fuel cell layer 502, relatively rigid fluid manifold 504, and internal supports is shown. One or more internal supports or bonds 505a-505c may be part of a gas management system, whose function may be, in part, to structurally support flexible fuel cell layer 502 during any movement thereof. (One example of movement may be a result of the pressurization and de-pressurization of a plenum in spaces 510a-510d.) As shown in FIG. 5C, fuel cell layer 502 is bonded at support sites 505a-505c to fluid manifold 504. In particular, the support sites at 505a-505c can be configured to align with one or more current collectors of the fuel cell layer and may employ a conductive epoxy adhesive in order to bond fluid manifold 504 to fuel cell layer 502. The conductive epoxy adhesive may be cured under appropriate conditions of heat, pressure, or combinations thereof. Heating and pressing may be done simultaneously or sequentially. The conductive epoxy may serve as part of the current collection system in the fuel cell and may be integral with fluid manifold 504, or may be in electrical contact with an electrically conductive portion of fluid manifold 504. As a result, a series of plenums 510-510d are formed by portions 502a-502d of fuel cell layer 502 as they inflated with pressurizing fluid. In some embodiments, portions of the fuel cell layer may be directly bonded or attached to the fluid manifold, for example by way of an adhesive member. In embodiments such as that shown in FIG. 5C, any deformation of the fuel cell layer may be extremely small, or almost imperceptible. For example, if the distance between subsequent bond members is sufficiently small, the unsupported area of the flexible fuel cell layer may also be small, and therefore the layer may not noticeably deform when the system is pressurized with a fluid.

FIG. 5D shows an embodiment equivalent to that shown in FIG. 5C except that here, fluid manifold 504 is a flexible component and fuel cell layer 502 is relatively rigid. Again, bonds 505a-505c are made between fuel cell layer 502 and fluid manifold 504 thereby creating a series of enclosed regions. As before, these regions are transformed, via deformation of portions 504a-504d of fluid manifold 504, to become a series of fluid plenums 510a-510d when fluid pressure is admitted to the enclosed regions.

FIG. 5E shows yet another alternative with internal supports (bonds) in which the system comprises two flexible components. In FIG. 5E, there are two flexible fuel cell layers 502a, 502b bonded to fluid manifold 504 at the periphery and at several internal locations 505a-505c. Again, this forms a series of enclosed regions which, when pressurized with fluid, are transformed into numerous fluid plenums.

As shown, certain embodiments of the present invention include a flexible fuel cell layer. The layer includes two or more fuel cells substantially integrated within a two-dimensional layer, a substrate coupled to the layer forming an enclosed region between the substrate and layer. The layer can be positioned in a planar or non-planar configuration and the layer is configured such that it is operable when self-supported. As used herein, "operable" refers to an electrochemical cell layer or individual electrochemical cells capable of producing an electrical current or voltage. For example, a fuel cell layer may be in an operable position and capable of producing electricity without further manipulation in position or confirmation.

Figure 3:
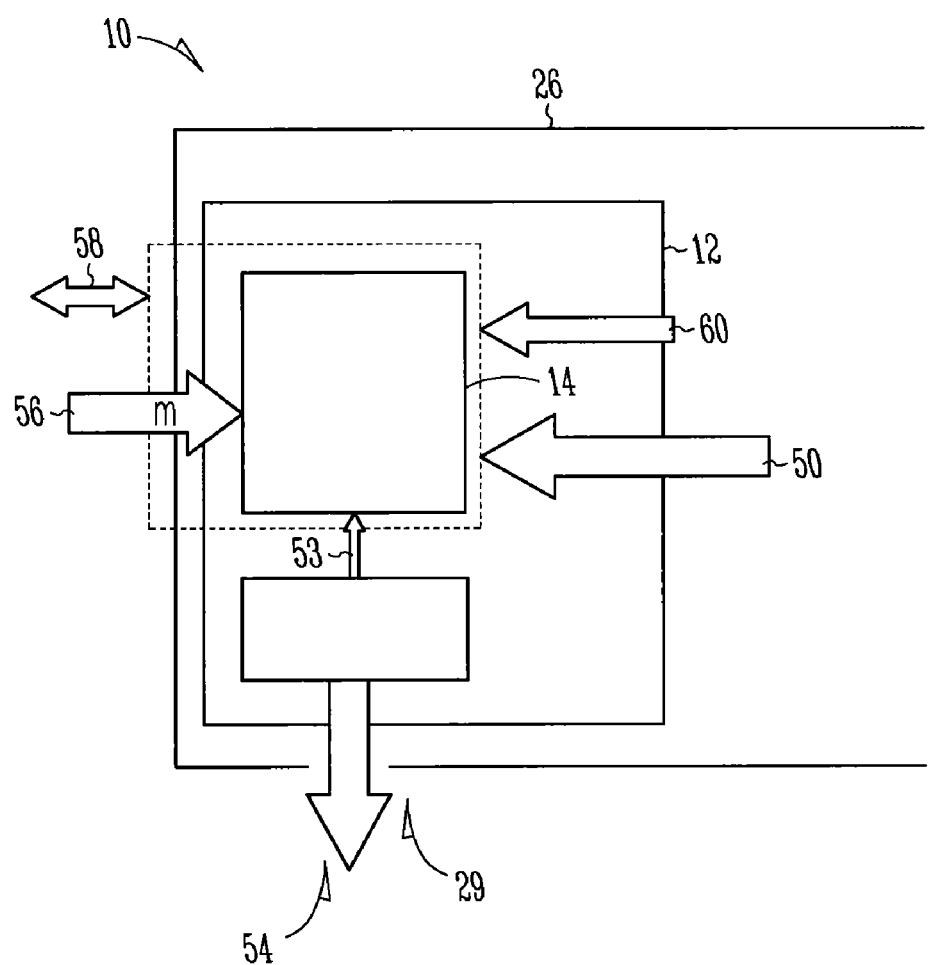
FIG. 3 is a diagrammatic view that illustrates various transport mechanisms for an application device, according to the various embodiments.

FIG. 3 is a diagrammatic view that illustrates various transport mechanisms during operation of the application device 10 of FIG. 1. As described above, heat may be generated by the various components in the application device, such as, for example, the electrical power consumers 20 shown in FIG. 1. The endothermic apparatus 14 (FIG. 1) absorbs heat through at least heat transmission path 24 (FIG. 1) as shown in FIG. 3 as heat flow 50. Heat may further be produced during operation of the electrochemical cells 16 (FIG. 1). Under some conditions, heat generated by the electrochemical cells 16 may also be moved to the endothermic apparatus 14 (FIG. 1), as shown in FIG. 3 as heat flow 53.

While some heat generated by the electrochemical cells 16 (FIG. 1) may be absorbed by the endothermic apparatus 14, heat may still require dissipation and may be further removed from the appliance device 10 through an aperture 29 in the housing 26, as shown in FIG. 3 as heat flow 50. In various embodiments, the endothermic apparatus 14 may be replenished with a hydrogen energy carrier thereby providing input energy to the system. The endothermic apparatus 14 may be replenished while integrated in the device, as indicated by the mass flow 56 in FIG. 3. Replenishment may occur during a shut-down mode of the application device 10 when the electrical power consumers 20 may be thermally neutral. The endothermic apparatus 14 may be alternately replenished external to the device. For example, the endothermic apparatus 14 may be configured to be removably coupled to the application device 10, as indicated by the arrow 58 in FIG. 3. The endothermic apparatus 14 may therefore include a disposable cartridge or a satellite cartridge that may be replenished external to the application device 10. Note that the endothermic apparatus 14 may either absorb heat by the phase change of the hydrogen carrier or through the breaking (or making) of chemical bonds. In the case of a disposable single use fuel, the heat is absorbed and not recovered. In the case of a refuelable metal hydride system the heat is effectively stored in the metal hydride and then later dumped when refueling occurs. In the various embodiments, at least a portion of the heat generated by the combined fuel cell/device is not rejected to the environment but used or stored on-board. In the case of a high enthalpy fuel source combined with a high efficiency fuel cell it may be possible for the overall system to have a net cooling effect on the environment.

Under some conditions, such as during a start-up mode of the application device 10, additional energy input from the secondary device 28 (FIG. 1) may be required to initiate operation of the endothermic apparatus 14, as indicated by the heat flow at 60. In various embodiments, the start-up device 10 includes a secondary electrochemical cell, such as a battery or a capacitor (e.g., an ultracapacitor), as earlier described, which may provide power to the electrical power consumers 20. In various embodiments, the battery may be coupled to a resistive heating element configured to transfer heat to the endothermic apparatus 14 during startup. In another of the various embodiments, the secondary device 28 includes a hydrogen store for providing an initial amount of hydrogen to the fuel cells until sufficient heat may be available to initiate hydrogen production by the endothermic apparatus 14. In still another of the various embodiments, the hydrogen store provides fuel to a catalytic heater to initiate the hydrogen production.

Embodiments of the invention also relate to a method of managing heat generated in an application device. The method may include transferring at least a portion of heat produced by an electrical power consumer to a reactant supply configured to deliver a reactant to a fuel cell device. The release of the reactant may be stimulated from the reactant supply in response to the transferred heat. Transferring heat may include actively transferring heat produced, such as by thermally coupling a first thermal interface on a thermoelectric device to the electrical power consumer and thermally coupling a second thermal interface on the thermoelectric device to the reactant supply and then providing electrical energy to the thermoelectric device to communicate the heat from the first thermal interface to the second thermal interface. Actively transferring may also include providing an active thermal transmission path, further including passively transferring the heat to the reactant supply by providing a passive transmission path in parallel with the active thermal transmission path. The net heat released to ambient from the application device may be less than a net heat produced by the combination of the electrochemical cell and the electrical power consumer.

A first portion of the heat may be actively dissipated from the fuel cell device to the reactant supply and a second portion of the heat may be dissipated to an ambient environment, such as external to the device. Heat may also be transferred from a secondary device to the reactant supply, such as a fuel enclosure. The fuel enclosure may release fuel in response to the transferred heat. Stimulating may refer to generating, producing, desorbing or any combination thereof, for example.

Figure 6:
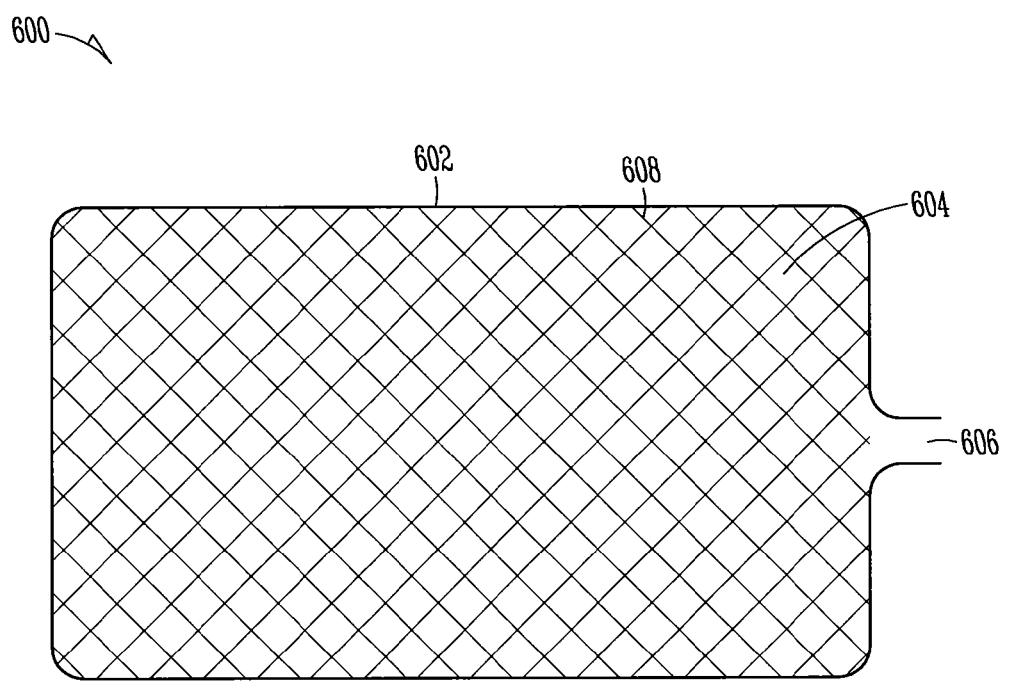
FIG. 6 is a cross-sectional view of a fluid enclosure, according to some embodiments.

Referring to FIG. 6, a cross-sectional view of a fluid enclosure 600 is shown, according to some embodiments. A structural filler 604 may be surrounded by an outer enclosure wall 602. The structural filler 604 may be conformably coupled to the outer enclosure wall 602, which may be represented by a bond 608. One or more optional features 606 may be utilized.

The structural filler 604 may include a material with a sufficient tensile strength to withstand the internal pressure of the fluid enclosure 600, when pressurized with a fluid. Structural fillers may be solid. Structural fillers 604 may include metallic or plastic lattices, composite hydrogen storage materials, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example.

The structural filler 604 may include a material capable of occluding/desorbing a fluid, such as a metal hydride. This results in a material with sufficient tensile strength and fluid occluding/desorbing properties, such as composite hydrogen storage material, nano-structured carbon foams, aerogels or zeolites, for example. In addition, the fluid enclosure 600 may include a structural filler 604 and a separate, fluid occluding/desorbing material, such as a metal hydride powder or clathrate. For example, the structural filler 604 may be inert to the fluid being stored and the fluid enclosure may separately include a fluid occluding/desorbing material. If a lattice, the structural filler 604 may include small pores. Pores in the structural filler 604 may be used to hold fluid occluding/desorbing materials, such as metal hydrides or clathrates, for example. A methane clathrate may be used to store methane efficiently at high pressure and could be used in conjunction with a structural filler 604, such as a metal lattice.

The structural filler 604 may be conformably coupled to the outer enclosure wall 602, creating a bond 608. As the force due to internal pressure within the fluid enclosure 600 increases, the load may be transferred directly into a tensile load on the structural filler 604, rather than internal pressure being amplified into tensile load on the outer enclosure wall 602. The internal pressure of the fluid enclosure 600 may be affected by the amount of fluid stored. In addition, the amount of stress applied to the fluid enclosure 600 may be affected by the mechanical stress associated with contacting/releasing a fluid from a storage material, such as hydrogen occluding/desorbing from a metal hydride, for example.

The structural filler 604 may have a continuous, uniform thickness throughout the fluid enclosure 600. Alternatively, the structural filler 604 may include pockets or areas of discontinuous thickness or density, for example. One case may be where an irregularly shaped fluid enclosure 600 calls for more structural support, such as in a corner, the structural filler 604 may be more dense or include a greater portion of the available space within that area of the fluid enclosure 600.

The outer enclosure wall 602 may include a multitude of materials due to the low stress applied to the outer enclosure wall 602. The outer enclosure wall 602 may include a polymer or metal or multiple layers of each, for example. The outer enclosure wall 602 may be polypropylene, Kynar Flex® (vinylidene fluoride hexafluoropropylene copolymer) (available through Arkema Inc, Philadelphia, Pa.), polyethylene, polyvinylidene fluoride (PVDF), hexafluoropropylene vinylidene fluoride copolymer, cross-linked copolymers, polytetrafluoroethylene (PTFE), perfluoro alkoxy (PFA), thermoplastic polyesters (for example, Nylon™), or combinations thereof, for example. The outer enclosure wall 602 may be formed of the same material as at least a portion of the structural filler 604, for example. The outer enclosure wall 602 may be a sheet or a solution, prior to application. The outer enclosure wall 602 does not have to be rigid or in any pre-formed shape. The outer enclosure wall 602 may act as a barrier to the exit of a fluid from the structural filler 604.

Because the structural filler 604 may be bonded to the outer enclosure wall 602, the stresses induced on the outer enclosure wall 602 become independent of the geometry chosen. In conventional enclosure designs, the geometry of the enclosure strongly dictates the relationship between the stress in the enclosure wall and the internal pressure. If a structural filler 604 is conformably coupled to the outer enclosure wall 602, virtually any geometry of the fluid enclosure 600 may be utilized, so long as the tensile strength of the structural filler 604 and the bond 608 between the structural filler 604 and outer enclosure wall 602 is larger than the internal pressure. The structural filler 604 may be formed into a desired shape before the outer enclosure wall 602 is conformably coupled to it.

The outer enclosure wall 602 may have a uniform or a varying wall thickness, for example. The outer enclosure wall 602 may have a greater wall thickness around a feature, for example. The outer enclosure wall 602 may have an average wall thickness of less than about 5000 microns, less than about 1500 microns, less than about 500 microns, less than about 300 microns, less than about 100 microns, less than about 50 microns, less than about 10 microns or less than about 1 micron, for example.

Figure 7:
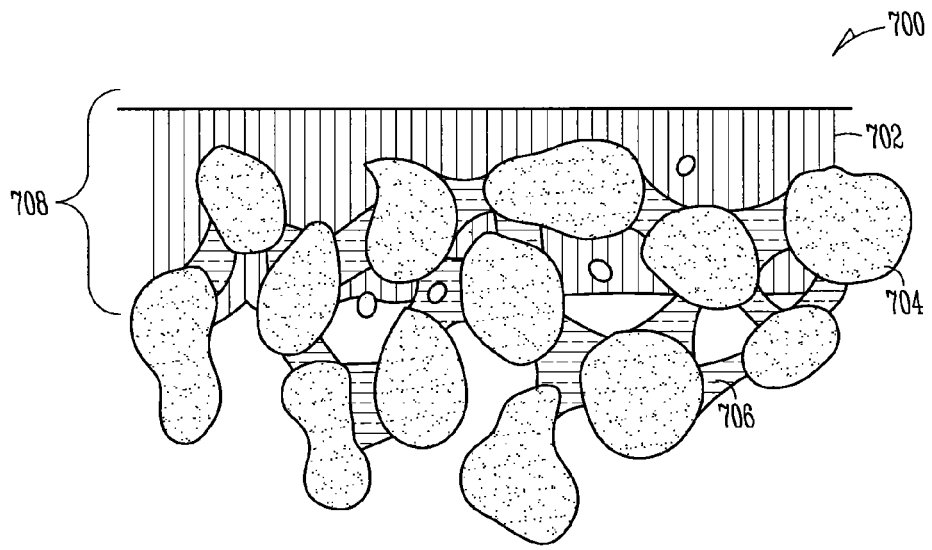
FIG. 7 is a cross-sectional view of a portion of a fluid enclosure utilizing a composite hydrogen storage material, according to some embodiments.

Referring to FIG. 7, a cross-sectional view of a portion of a fluid enclosure 700 utilizing a composite hydrogen storage material is shown, according to some embodiments. Active particles 704 are immobilized by a binder 706, making up the composite hydrogen storage material, which is an example of a structural filler 604. The outer enclosure wall 702 penetrates within the interface region 708, conformably coupling to the structural filler.

The interface region 708 includes the bond 708 between the structural filler 704 and outer enclosure wall 702 and may vary in thickness. The outer enclosure wall 702 may be uniformly or near uniformly bonded to the structural filler 604 so that a homogeneous or near homogenous interface 708 may be formed, which prevents localized stress concentrations building up at the outer enclosure wall 702. The outer enclosure wall 702 material may be applied to the structural filler 604 and allowed to penetrate the surface, creating a bond 608 in the interface region 708. The interface region 708 may become stronger than the structural filler 604, so that a failure of the fluid enclosure 700 may be a failure from the structural filler 604 and not from the bond 608 found at the interface 708. The interface region 708 may be less than about 50 microns, about 50-100 microns, about 100-150 microns, about 150-200 microns or more than 200 microns thick, for example.

Figure 8:
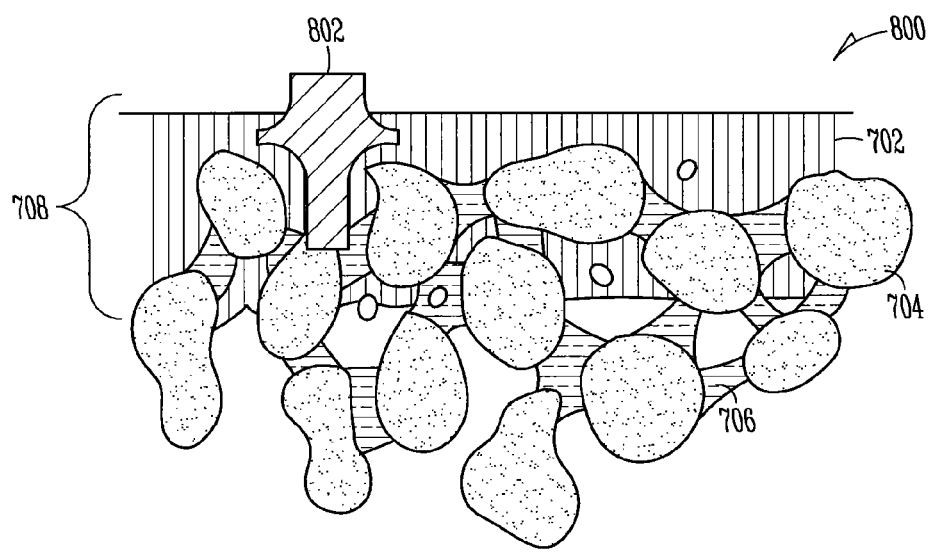
FIG. 8 is a cross-sectional view of a portion of a fluid enclosure utilizing a composite hydrogen storage material including a feature, according to some embodiments.

Referring to FIG. 8, a cross-sectional view of a portion of a fluid enclosure 800 utilizing a composite hydrogen storage material including a feature is shown, according to some embodiments. Active particles 704 are immobilized by a binder 706, making up the composite hydrogen storage material, which is an example of a structural filler 604. The outer enclosure wall 702 penetrates within the interface region 708, conformably coupling to the structural filler. One or more features 802 are positioned within the outer enclosure wall 802.

The one or more features 802 may be adapted to control the movement of a fluid into or out of the fluid enclosure 800, may observe or control the fluid or may be used as a structural component, for example. The one or more features 802 may be used to communicate between the fluid enclosure 800 and an external device, such as a fuel cell. Examples of a feature 802 may be a valve, vent, cap, fitting, regulator, pressure relief device, flow element (i.e., flow restrictor), etc. Examples of the one or more features 802 may include fluidic components sold by Swagelok Co. or Beswick Engineering Co., for example. In the case where the feature may be a pressure relief device, it may be a pressure-activated PRD or a thermally-activated PRD. Further, it may be a self-destructive type PRD, such as fusible trigger, rupture disk or diaphragm, or a re-sealable type, such as spring-loaded pressure relief valve (PRV). Alternately, the outer enclosure wall may be engineered to have a pressure relief feature engineered in/integrated into the wall itself.

The one or more features 802 may be structural features associated with the shape, positioning or alignment of the structural filler, the outer enclosure wall or the overall fluid enclosure. A structural feature may be formed to allow space for external components or to create more efficient alignment between the fluid enclosure and an external device, for example. Structural features may include convex protrusions, concave recesses, mountings, flanges, fittings, bosses, smoothed or radiused corners, threaded standoffs, latching or locking features, etc.

The one or more features 802 may include safety enhancing aspects. For example, the feature may include a small, recessed valve that may only be activated with the proper tool. Further, an example may be features of such size as to make them inaccessible to inadvertent activation, such as small features within a recessed area. The one or more features 802 may also include connecting hardware, in which the fluid enclosure 800 may be coupled to an external device, such that during connecting/disconnecting of the fluid enclosure 800, little to no leakage occurs.

Embodiments of the invention include a composite hydrogen storage material. The composite hydrogen storage material allows for the occlusion and desorption of hydrogen in which the particle bed packing traditionally caused by decrepitation during the hydriding/dehydriding cycle is reduced or eliminated. The composite hydrogen storage material comprises active material particles and a binder, wherein the binder immobilizes the active material particles sufficient to maintain relative spatial relationships between the active material particles. The composite hydrogen storage material may deform under hydriding, but substantially returns to its original shape and morphology, thus the three-dimensional relationships between the active material particles are essentially unchanged throughout multiple hydriding/dehydriding cycles.

The composite hydrogen storage material also may act as a load bearing member within a storage vessel (e.g., a fluid enclosure), effectively increasing the volumetric energy storage of the vessel. By utilizing the composite hydrogen storage material, requirements for filtration of loose metal hydride particles in the desorbed hydrogen stream is eliminated and the traditional problems of powder compaction in metal hydride storage vessels are eliminated. The composite hydrogen storage material is more thermally conductive than traditional metal hydride powders and retains similar absorption/desorption rate and capacity limits. The use of a composite hydrogen storage material for hydrogen storage is safer than traditional metal hydride powders as there is much less risk of storage vessel rupture due to powder compaction. Further, the use of a composite hydrogen storage material for hydrogen storage may allow for better compliance with national and international regulatory laws and procedures regarding the transport of hydrogen and hydrogen storage vessels.

While the various embodiments have been illustrated and described, as noted above, many changes can be made without departing from the scope of this disclosure. The accompanying drawings that form a part hereof show by way of illustration, and not of limitation, various embodiments in which the foregoing subject matter may be practiced. The various embodiments as illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the embodiments shown. Furthermore, although the various embodiments have been described with reference to fuel cell energy management systems and methods, it is understood that the various embodiments may be employed in a variety of known methods and systems without modification of any kind. This disclosure is intended to cover any and all adaptations or variations of various embodiments. Combinations of the above embodiments, and other embodiments not specifically described herein, will be apparent to those of ordinary skill in the art upon reviewing the above description.

What is claimed is:

1. A heat management system in a portable electronic device, comprising:
    a flexible fuel cell layer that includes two or more fuel cells and current collection components, wherein the two or more fuel cells and the current collection components are both substantially integrated within a two-dimensional layer;
    a fluid manifold coupled to the flexible fuel cell layer and forming an enclosed region between the fluid manifold and the flexible fuel cell layer;
    one or more internal supports bonded within the enclosed region to both the flexible fuel cell layer and the fluid manifold and wherein the one or more internal supports are configured to restrict outward expansion of the flexible fuel cell layer such that the flexible fuel cell layer is operable when self-supported;
    at least one electrical power consumer electrically connected to the flexible fuel cell layer;
    an endothermic fuel system configured to provide fuel to the flexible fuel cell layer; and
    at least one thermal transmission path thermally coupling the at least one electrical power consumer and the endothermic fuel system,
    wherein the thermal transmission path is configured to transfer heat produced by the electrical power consumer to the endothermic fuel system.

2. The heat management system of claim 1, wherein the thermal transmission path includes at least one active thermal transmission device.

3. The heat management system of claim 2, wherein the at least one thermal transmission path comprises a passive thermal transmission device that is coupled in parallel with the active thermal transmission device.

4. The heat management system of claim 1, wherein the endothermic fuel system comprises a fluid enclosure.

5. The heat management system of claim 4, where the fluid enclosure includes hydrogen gas, active material particles, a hydrogen carrier or combinations thereof.

6. The heat management system of claim 4, wherein the fluid enclosure is removably coupled to the endothermic fuel system.

7. The heat management system of claim 1, wherein the at least one thermal transmission path comprises a passive thermal transmission device.

8. The heat management system of claim 7, wherein the passive thermal transmission device comprises a conductive device, a phase change device, or combinations thereof.

9. The heat management system of claim 1, further comprising a secondary device in thermal communication with the endothermic fuel system and configured to selectively heat the endothermic fuel system.

10. The heat management system of claim 9, wherein the secondary device comprises any combination of a resistive heater coupled to a supplemental battery, or a fuel store and a catalytic heater.

11. The heat management system of claim 1, wherein the endothermic fuel system is configured to generate hydrogen to power the two or more fuel cells.

12. The heat management system of claim 1, wherein a change in enthalpy of the endothermic fuel system is less than or equal to 40 KJ/mol hydrogen produced.

13. The heat management system of claim 1, wherein the endothermic fuel system comprises a hydrogen carrier.

14. The heat management system of claim 13, wherein the hydrogen carrier comprises amines, metal amides, anhydrous ammonia, complex metal hydrides, boranes, hydrocarbons, or combinations thereof.

15. The heat management system of claim 1, wherein the heat management system is configured to dissipate at least a portion of the heat transferred by the thermal transmission path to an ambient environment through one or more cathodes of the flexible fuel cell layer.

16. The heat management system of claim 15, where the heat management system is configured to dissipate heat transferred by the thermal transmission path via an air flow across the one or more cathodes.

17. The heat management system of claim 1, further including a housing that includes one or more apertures that fluidly communicate with the ambient environment and wherein the flexible fuel cell layer is positioned to receive an oxidant from the ambient environment.

18. The heat management system of claim 1, further comprising a thermal transmission path coupling the flexible fuel cell layer to the endothermic fuel system.

19. The heat management system of claim 1, wherein the endothermic fuel system includes a satellite cartridge.

20. The heat management system of claim 1, wherein the heat management system further includes
    a plurality of fuel cells arranged in a fuel cell array;
    a housing that includes apertures; and
    a hydrogen generator;
    wherein the endothermic fuel system includes at least one of an evaporator, a compressor, a condenser, a reformer, or combinations thereof; and
    wherein the apertures are configured to allow oxidant from the ambient environment to fluidly communicate with the flexible fuel cell layer.

21. The heat management system of claim 1, wherein the one or more internal supports partition the enclosed region into at least two plenums.

22. The heat management system of claim 1, further including at least one fluid directing recess extending through the fluid manifold and in fluid communication with the enclosed region.

23. The heat management system of claim 22, further including a fluid enclosure in fluid communication with the at least one fluid directing recess and configured to supply a fuel to the enclosed region.

24. The heat management system of claim 1, wherein the endothermic fuel system includes a fluid enclosure that includes a structural filler and an outer enclosure wall conformably coupled to the structural filler, wherein the structural filler includes a material capable of occluding and desorbing a fluid and a binder and wherein the structural filler is configured to support stress applied by the internal fluid pressure.

25. The heat management system of claim 24, wherein the structural filler includes a composite hydrogen storage material that includes active material particles capable of occluding and desorbing hydrogen and a thermoplastic binder, wherein the thermoplastic binder elastically immobilizes the active material particles sufficient to maintain relative special relationships between the active material particles before, during, and after any occluding and desorbing of hydrogen.

26. The heat management system of claim 25, wherein the composite hydrogen storage material is capable of withstanding a force produced by a particle strain during occlusion and desorption of hydrogen by the active material particles, sufficient to provide a load bearing member independently or within the fluid enclosure.

27. The heat management system of claim 1, further including a bond member coupling the flexible fuel cell layer to the fluid manifold to form a perimeter seal around the enclosed region.

28. The heat management system of claim 1, wherein the endothermic fuel system is configured to release fuel when the thermal transmission path transfers heat to the endothermic fuel system.

* * * * *